Nov. 11, 1941.   F. SMITH   2,262,119
PARACHUTE PACK AND METHOD OF PACKING SAME
Filed Sept. 6, 1939
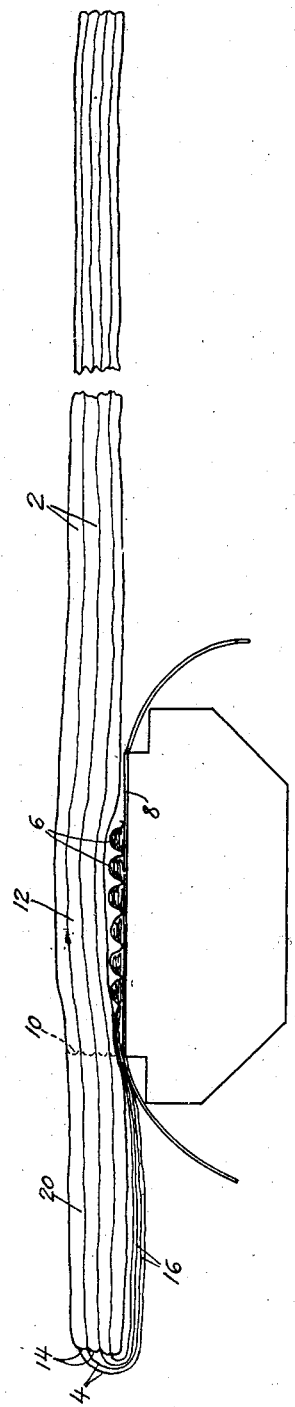
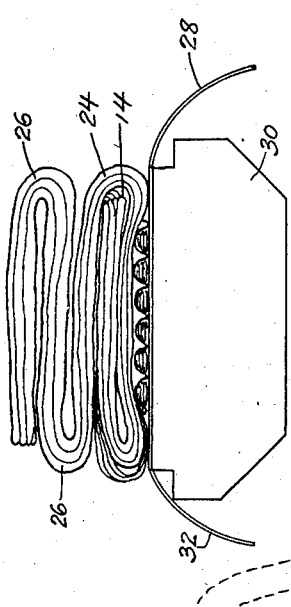
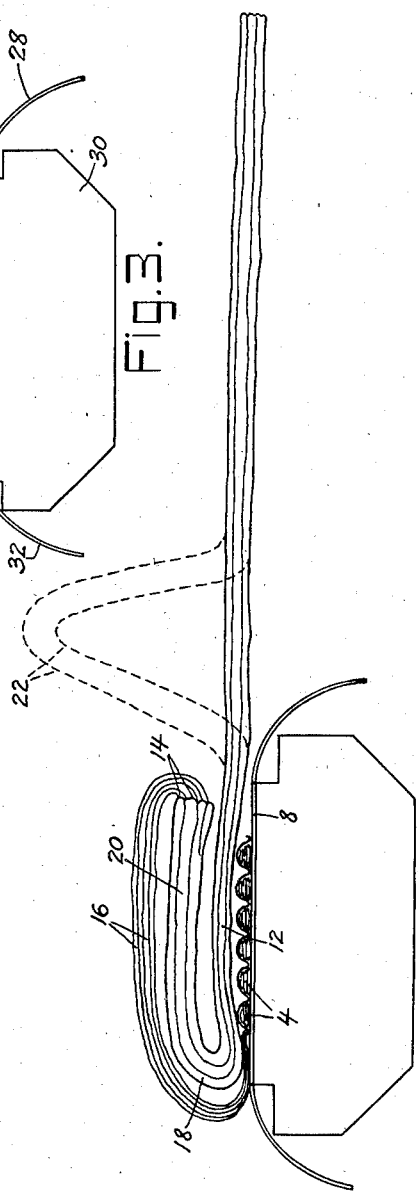
INVENTOR
FLOYD SMITH.
BY *Albert Sperry*
ATTORNEY Patented Nov. 11, 1941

2,262,119

UNITED STATES PATENT OFFICE 2,262,119

PARACHUTE PACK AND METHOD OF PACKING SAME

Floyd Smith, Manchester, Conn., assignor to Pioneer Parachute Company, Inc., Manchester, Conn., a corporation of Connecticut Application September 6, 1939, Serial No. 293,543

6 Claims. (Cl. 244—148)

My invention relates to parachute packs and to methods of folding and packing parachutes within such packs to insure proper opening of the parachute canopy on release thereof.

Heretofore in packing a parachute within a pack it has been usual to place the canopy on a table and to fold or pleat the gores or sections of the canopy so that they lie flat and so that the suspension lines are located close together. The suspension lines are then tucked into keepers in the base of the pack and the skirt of the canopy is placed on top of the shroud lines with the edge of the skirt adjacent an edge of the pack. The upper portion of the canopy is then folded back and forth upon itself and finally the pack flaps or other closure means are drawn tightly over the folded canopy and secured in place so that the canopy is compressed into a thin mass.

When the pack flaps are released in use the compressed canopy springs up from its compressed state. Then if the free edges of the skirt are facing toward the air stream or are even inclined within 20 degrees of the air stream the upper folds or pleats of the skirt usually are caught by the air. When this occurs a portion of the skirt is frequently thrown back over the remaining unfolded or partially folded portions of the canopy carrying a part of the suspension lines with it. One or more of the suspension lines may thus be thrown over the top of the canopy or the lines may tear or burn the canopy when the canopy is jerked to its fully opened position. It is also quite common for the suspension lines to become tangled with each other when the skirt of the canopy is jerked out and thrown back by the air and instances are known in which the canopy has been turned completely inside out under such conditions.

This faulty operation of the parachute not only tends to tear or injure the canopy but is actually one of the greatest hazards to the user because it may result in failure of the canopy to open or may cause it to open slowly or imperfectly. Many parachute jumpers, knowing these dangers, insist upon having their parachutes packed so that the skirt faces a particular side of the pack, depending upon their usual style of leap from an aircraft.

In order to overcome these objections to prior methods of packing parachutes and also to avoid the necessity of packing parachutes differently for each aviator, I have developed a method of packing a parachute which prevents exposure of the free edges of the skirt of the parachute canopy to air currents until the canopy has been drawn out to substantially its entire length. In this way the danger of having a portion of the skirt or suspension lines thrown over the canopy and the danger of inversion of the canopy is entirely eliminated or greatly reduced.

One of the objects of the present invention is to eliminate or reduce the fouling of suspension lines of a parachute on release thereof from a pack.

Another object of my invention is to prevent the suspension lines from being thrown over the canopy of a parachute.

Another object of my invention is to prevent the skirt of a parachute canopy from being thrown over a partially folded upper portion of the canopy when the parachute is released from a pack.

A further object of my invention is to provide a parachute pack with a parachute arranged therein in such a way as to insure proper opening of the parachute.

Another object of my invention is to provide a novel method of folding a parachute for enclosure within a pack.

These and other objects and features of my invention will appear from the following description thereof in which reference is made to the figures of the accompanying drawing.

In the drawing:

Fig. 1 is a side elevation of a parachute and parachute pack showing one stage in the folding of a parachute in accordance with my invention.

Fig. 2 is a side elevation showing a second stage in the folding operation, and

Fig. 3 is a side elevation of a parachute fully folded ready for closing the pack flaps.

In packing a parachute in accordance with my invention and as illustrated in the figures of the drawing the parachute is stretched upon a table and the gores or sections of the parachute between the suspension lines are folded into pleats as shown at 2 in Fig. 1. The suspension lines 4 are thus brought close together as in prior practice in packing a parachute and the lines are then tucked into keepers 6 carried by the base 8 of a parachute pack.

Heretofore it has been the practice to locate the free edges of the skirt of the pleated canopy adjacent one edge of the base 8 of the parachute pack as indicated by the dotted lines 10 in Fig. 1. In contrast with such practice I move the pleated canopy on beyond the base of the parachute pack so that a portion 12 of the canopy spaced from the free edges 14 of the skirt rests upon the stowed suspension lines and keepers. The free edges 14 of the skirt extend beyond the edge of the base of the pack a distance somewhat less than the width of the base 8. The portions 16 of the suspension lines adjacent to the free edges of the skirt are not stowed in the keepers as heretofore but extend from the base of the pack to the edges of the skirt.

In the second operation of folding the canopy illustrated in Fig. 2 the extended portion of the canopy and the portions 16 of the suspension lines are folded back over the portion 12 of the canopy which rests directly upon the suspension lines and keepers. Thus a lower-most fold 18 is formed in the canopy and the portions 16 of the suspension lines extend from the base 8 about the fold 18 and overlie the portion 20 of the pleated canopy adjacent the free edges of the skirt.

Thereafter the upper pleated but unfolded portion of the canopy is raised as indicated by dotted lines 22 in Fig. 2 and is folded back over the free edges 14 of the skirt of the canopy and over the portions 16 of the suspension lines. In this way a second fold 24 is formed to extend about and over the free edges 14 of the skirt as shown in Fig. 3. The rest of the upper portion of the pleated canopy is then folded back and forth upon itself as shown at 26 in Fig. 3 until the whole canopy is folded.

After the canopy has been folded as described it is compressed so that the pack flaps 28, 30 and 32 may be folded over the top of the canopy or whatever other type of enclosure used in the pack may be closed and secured in place by releasable means (not shown) to permit the parachute to be released in operation.

The pack thus formed has the canopy and suspension lines of the parachute so folded and arranged therein that the free edges of the skirt of the canopy are covered by a fold in the upper portion of the canopy and are thus shielded from air currents when the pack flaps are released and the canopy springs up from its compressed position. On release of the pack flaps the upper folds 26 of the canopy must necessarily be extended by a pilot chute or otherwise before the free edges 14 of the skirt are exposed. Thereafter the portion 12 of the canopy which lies directly adjacent the stowed suspension lines 4 and the keepers 6 is pulled out from beneath the portion 20 adjacent the skirt of the canopy so that the suspension lines may be drawn from their keepers and the canopy expanded in its intended manner.

The method of folding the parachute and the resulting pack are obviously independent of the type of parachute employed and similarly any type of pack or enclosing means for the parachute may be used in the practice of my invention. The free edge of the skirt of the canopy may obviously face in any direction without altering the operation of the canopy and without being influenced by the characteristics or manner in which any particular aviator may leap from an aeroplane or other aircraft. It should therefore be understood that the manner of folding and the type of parachute illustrated in the figures of the drawing and described above are intended to be illustrative of my invention and are not intended to limit the scope thereof.

I claim:

1. A parachute pack comprising a cover with a parachute canopy enclosed therein, said canopy having the portion thereof adjacent the peak arranged in zig-zag folds adapted to emerge successively from the pack when the pack is opened, and having the portion of the canopy adjacent the skirt oppositely folded and lying between the last of the zig-zag folds so that the last zig-zag fold extends about the skirt in position to shield the skirt from air currents when the pack is opened in use.

2. A parachute pack comprising the canopy of a parachute and means enclosing the canopy, the canopy being arranged within said means with a fold of the canopy extending about the free edges of the skirt of the canopy in position to shield said edges from air currents when the pack is opened in use.

3. A parachute pack comprising a base, enclosing members and a parachute resting upon said base and enclosed by said members, said parachute having the canopy thereof arranged with a portion of the canopy that is spaced from the free edges of the skirt located adjacent the base, the free edges of the skirt resting upon said portion of the canopy and an upper portion of the canopy folded over the free edges of the skirt of the canopy in position to shield said edges when the pack is opened in use.

4. A parachute pack comprisng an enclosure having a base and enclosing members and a parachute resting upon said base and enclosed by said members, said parachute having a canopy and suspension lines arranged within the enclosure with the suspension lines releasably stowed in the base, a portion of the canopy spaced from the free edges of the skirt located adjacent the suspension lines, the free edges of the skirt located above said portion of the canopy and an upper portion of the canopy folded back over the free edges of the skirt of the canopy, said parachute being compressed and said enclosing members releasably holding the parachute in its compressed form.

5. A method of folding a parachute for enclosure within a pack which comprises the step of folding a portion of the canopy about the free edges of the skirt into a position to shield said edges from air currents when the pack is opened in use.

6. A method of folding a parachute for enclosure within a parachute pack comprising the steps of stowing the suspension lines of the parachute in the base of a parachute pack, placing a portion of the canopy spaced from the free edges of the skirt upon the stowed suspension lines in such a position that the free edges of the skirt are spaced from an edge of the base of the pack a distance less than the width of the base, folding the portion of the canopy skirt adjacent the free edges thereof back upon that portion of the canopy placed upon the stowed suspension lines and folding an upper portion of the pleated canopy over the free edges of the skirt whereby when the pack is opened in use the free edges of the skirt of the canopy are shielded from air currents by an upper portion of the canopy.

FLOYD SMITH.